United States Patent [19]
Payne

[11] 3,893,816
[45] July 8, 1975

[54] GEAR PUMPS

[75] Inventor: Allan John Payne, Asthal Leigh, near Leafield, England

[73] Assignee: Smiths Industries Limited, London, England

[22] Filed: Nov. 21, 1972

[21] Appl. No.: 308,613

[30] Foreign Application Priority Data
Nov. 24, 1971 United Kingdom............... 54678/71
Jan. 3, 1972 United Kingdom..................... 72/72
Sept. 8, 1972 United Kingdom............... 41702/72

[52] U.S. Cl. ... 29/156.4 WL; 29/DIG. 26; 29/527.6; 90/11 C
[51] Int. Cl. ........................................... B23p 13/00
[58] Field of Search........... 29/156.4 WL, 156.4 R, 29/DIG. 26, DIG. 19, 527.6; 51/290; 90/11 C, 15

[56] References Cited
UNITED STATES PATENTS

| | | | |
|---|---|---|---|
| 1,053,677 | 2/1913 | Sutton............................. | 418/178 |
| 2,491,677 | 12/1949 | McCulloch..................... | 29/156.8 R |
| 2,491,678 | 12/1949 | McCulloch et al. ............ | 29/156.8 R |
| 2,492,935 | 12/1949 | McCulloch et al. ............ | 29/156.8 R |
| 2,853,766 | 9/1958 | Wellington...................... | 29/156.4 R |
| 3,614,249 | 10/1971 | Nishioka........................ | 29/156.4 R |

FOREIGN PATENTS OR APPLICATIONS
535,554  4/1941  United Kingdom............ 29/156.4 R

*Primary Examiner*—C. W. Lanham
*Assistant Examiner*—Dan C. Crane
*Attorney, Agent, or Firm*—Elliott I. Pollock

[57] ABSTRACT

A gear pump includes a housing having a shaped recess in which a pair of meshing gears are rotatably mounted to pump hydraulic fluid from an inlet region of the recess to an outlet region thereof. The recess provides a snug fit for the meshing gears and to this end the surfaces of the housing which bound the toothed peripheries of the meshing gears are machined with the teeth of the said gears and the gears are thereafter mounted in the housing with the teeth of the gears lightly abutting the machined surfaces. The gears are used either directly to machine the appropriate part of the housing, in which case that part is of a material which is substantially softer than the gears, or to machine a lining on the housing which is substantially softer than the gears.

9 Claims, 10 Drawing Figures

3,893,816

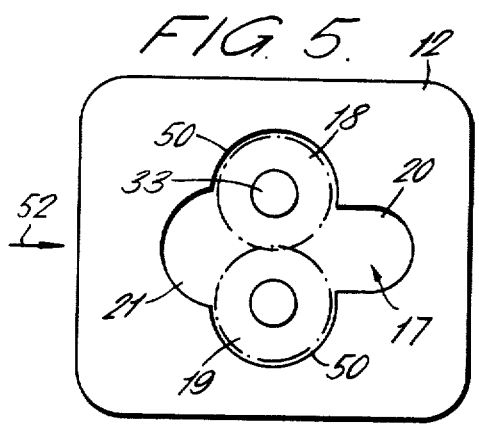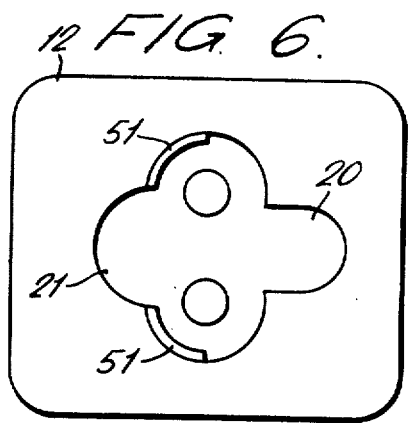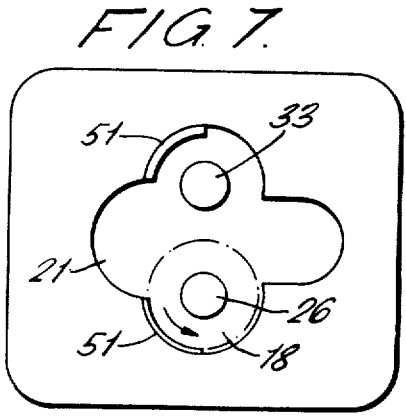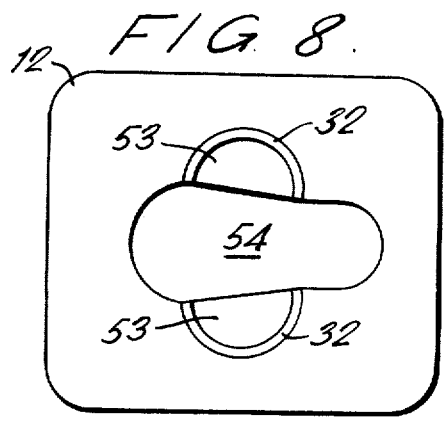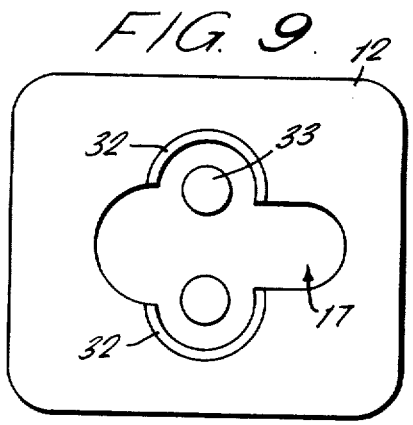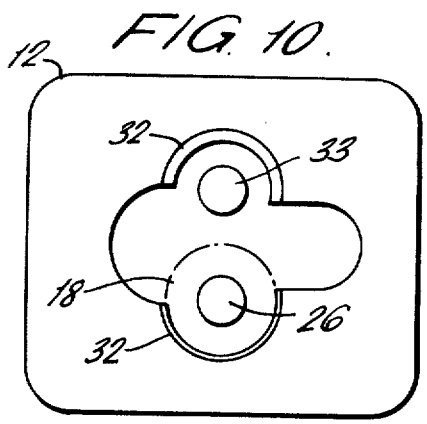

GEAR PUMPS

This invention relates to gear pumps and, in particular, to gear pumps of the kind comprising a housing having a shaped chamber in which two meshing metal gears are arranged to be rotatably mounted, and which defines an outlet region centrally and to one side of an imaginary line joining the rotational axis of the gears and an inlet region centrally and to the opposite side of the imaginary line, the arrangement being such that in use hydraulic fluid is impelled by the gears from the inlet region to the outlet region. Such a gear pump will hereinafter be referred to as "a gear pump of the kind specified."

In use the fluid pressure in the outlet region will be substantially higher than the fluid pressure in the inlet region. Because of this it is desirable that the gears (usually of hardened steel) fit snugly within the chamber, for otherwise the fluid will tend to leak back into the inlet region. Heretofore this snug fit has been accomplished by accurately machining the housing from a metal solid, of for example, steel, but this is extremely difficult.

According to the present invention there is provided a method of manufacturing a gear pump of the kind specified including the step of forming within a body of the housing a recess or aperture in which the meshing gears are to be disposed, a part of the recess or aperture being formed by machining the body using the teeth of at least one said gear in a sense to increase the transverse dimensions of the recess or aperture such that at least part of the surface of the body which is to bound the toothed periphery of each of the meshing gears is formed by said machining.

By 'transverse dimensions' is meant the dimensions of the recess or aperture in planes extending transversely of the rotational axes of the gears when mounted in the housing.

The gear or gears used to machine the body are preferably the actual gears which are to be mounted in the housing but it is visualized that the machining may be effected by other gears of similar or identical form.

The body may be of a metal which is softer than that of the metal gears, and, in these circumstances, the transverse dimensions of the recess or aperture may be increased by directly machining the metal body with at least one said gear.

The body may be of a metal which is softer than that of the said gear, and, in this case, the transverse dimensions of the recess or aperture may be increased by directly machining the metal body with at least one said gear.

In a first form of the present invention the said method may include the steps of disposing a said gear parallel to a face of the body in which the recess or aperture has been partially formed with the said gear aligned with the said body, the shape and transverse dimensions of the partially-formed recess or aperture being selected so that the teeth of the said gear overlap a portion of the body bounding the recesses or aperture, and driving the said gear into the body along a path parallel to the rotational axis of the said gear while the gear is being rotatably driven about its rotational axis to cause the teeth of the gear to machine away the said overlapping portion of the body.

In a second form of the present invention the said method may include the steps of forming within the body a recess or aperture in which the meshing gears are to be disposed, the transverse dimensions of the recess or aperture being adapted to provide a continuous space between the edge of the recess or aperture and the toothed periphery of the meshing gears, lining at least part of the said edge of the recess or aperture with a material which is substantially softer than the material of the meshing gears, and machining away a part of the lining with a said gear to increase the transverse dimensions of the recess or aperture.

In a third form of the present invention the said method may include the steps of forming within a face of the body a recess or aperture in which the meshing gears are to be disposed, the transverse dimensions of the recess or aperture being adapted to provide a continuous space between the edge of the recess or aperture and the toothed periphery of the meshing gears, lining at least part of the edge of the recess or aperture which is to bound the toothed periphery of each gear with a material which is substantially softer than the material of the meshing gears, disposing a said gear parallel to the said face with the said gear aligned with the said body, the thickness of the lining being greater than the width of the said space so that the teeth of the said gear overlap a portion of the lining, and driving the said gear into the body along a path parallel to the rotational axis of the said gear while the gear is being rotatably driven about its rotational axis to cause the teeth of the said gear to machine away the said overlapping portion of the lining.

The lining may be in the form of a coating or comprise a moulded insert.

One form of gear pump of the kind specified, and various methods of manufacturing such a gear pump in accordance with the present invention, will now be described, by way of example, with reference to the accompanying drawings in which:

FIGS. 5 to 7 are diagrams used to illustrate a second method of forming the aperture; and FIGS. 8 to 10 are diagrams used to illustrate a third method of forming the aperture.

Figure 1:
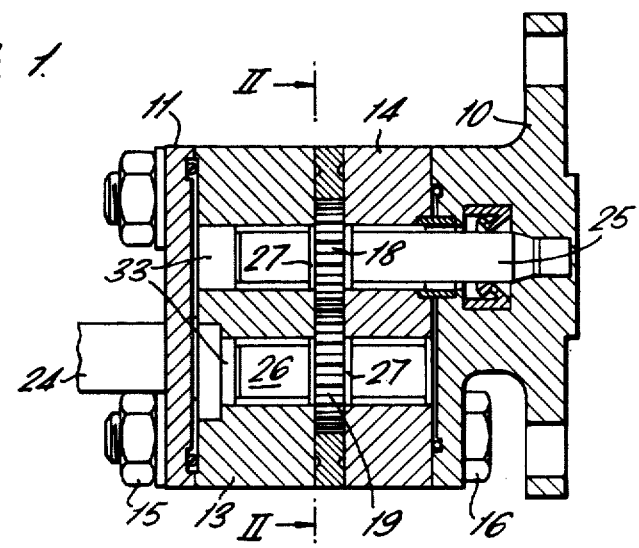
FIG. 1 is a sectional side view of a gear pump of the kind specified.
Figure 2:
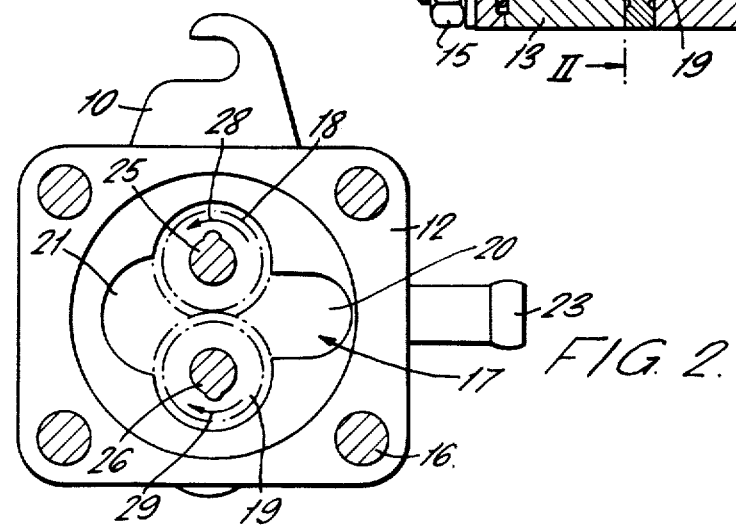
FIG. 2 is a sectional view on the line II—II of FIG. 1.

Referring to FIGS. 1 and 2, the gear pump includes a housing comprising end pieces 10 and 11 of steel, a central pressure plate 12, and intermediate members 13 and 14 of steel between the pressure plate 12 and the end pieces 10 and 11. The end pieces 10 and 11, the pressure plate 12 and the members 13 and 14 are clamped together by nuts and bolts 15 and 16 respectively. The pressure plate 12 has an aperture 17 in which is mounted two meshing, metal gears 18 and 19 of, for example, steel, the aperture 17 being shaped to provide an inlet region 20 and an outlet region 21 for oil which is to be pumped by the gears 18 and 19. The inlet region 20 and the outlet region 21 are disposed on opposite sides of an imaginary line joining the rotational axes of the gears 18 and 19, and communicate with respective inlet and outlet pipes, the inlet pipe being shown at 23. The gears 18 and 19 are mounted on, respectively, a drive shaft 25 and a shaft 26 for rotation therewith, the shafts 25 and 26 being rotatably mounted in holes 33 in the members 13 and 14. More particularly, the gears 18 and 19 are mounted on the shafts 25 and 26 between respective pairs of circlips 27 to prevent relative axial displacement of the gears 18 and 19 and the shafts 25 and 26. A pressure relief valve 24 is provided to maintain the pressure in the outlet region 21 below a predetermined value.

In operation, the drive shaft 25 is driven by a motor (not shown) to rotate the meshing gears 18 and 19 in the direction of the arrows 28 and 29 respectively and hydraulic fluid in the inlet region 20 is collected in the grooves between the gear teeth and transferred to the outlet region 21. The pressure of the hydraulic fluid in the outlet region 21 will be very much higher than the pressure of the hydraulic fluid in the inlet region 20, and in order to prevent leakage of the hydraulic fluid from the outlet region 21 to the inlet region it is necessary that the meshing gears 18 and 19 fit snugly within the plate 12. This may be accomplished in accordance with the present invention by machining the surfaces of the plate 12 which are to bound the toothed peripheries of the gears 18 and 19 using the teeth of the gears 18 and 19 or of similar or identical gears. This may be effected either by directly machining the plate 12, in which case the plate 12 is arranged to be of a material which is readily machinable by the gears, or by machining a lining on the surface of the plate 12 which is to bound the toothed peripheries of the meshing gears 18 and 19, the lining being of a material which is readily machinable by the gears.

In the former case the plate 12 is of a stable material, for example, mild steel, cast iron, or a sintered material, which may be readily cut by the gears 18 and 19.

Figure 3:
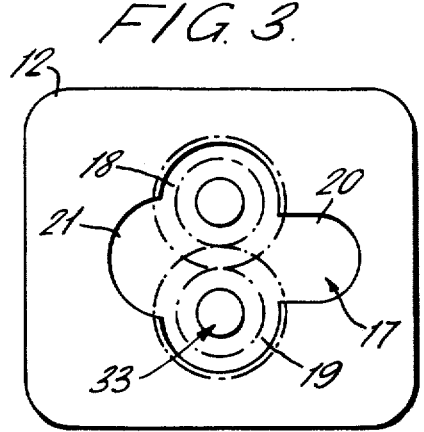
FIGS. 3 and 4 are diagrams used to illustrate a first method of forming an aperture in a plate 12 for housing the meshing gears.
Figure 4:
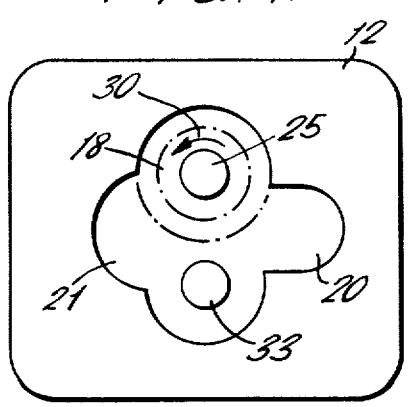

A method of forming the aperture 17 in the plate 12 by directly machining the plate 12 using the gears 18 and 19 will now be described. Referring to FIGS. 3 and 4, the plate 12 is mounted on the intermediate member 14 (FIG. 3) with the aperture 17 aligned with the holes 33 in the member 14. In this case, the transverse dimensions of the aperture 17 are selected so that, as shown in FIG. 3, the plate 12 overlaps the intended position of the gears 18 and 19 within the plate 12, it being arranged that the extent of such overlap is substantially less than the depth of the gear teeth. The said overlapping portion of the plate 12 is then machined away (FIG. 4) using the gears 18 and 19. To this end, one of the gears is mounted on its shaft and one end of the shaft is located in one of the holes 33 of the member 14. The other end of the shaft is conveniently inserted in a chuck of a drill, and the gear is then rotated by the drill in the direction of the arrow 30 at a speed of approximately 400 to 500 RPM and gradually urged into the plate 12 to machine away the portion of the plate which overlaps one of the gear positions. The method is then repeated to machine away the portion of the plate which overlaps the other gear position by mounting the other gear on its shaft, locating one end of that spindle in the appropriate hole 33, inserting the other end of the spindle in the drill chuck, and rotatably driving the gear into the plate 12.

Although in the method described the machining of the plate 12 is effected in two separate operations by using the gears one at a time, it is visualized that this machining may be effected in a single operation by using the gears simultaneously to machine the plate 12.

As previously mentioned the gears 18 and 19 may be used to machine a lining on a surface of the plate 12 which is to bound the toothed periphery of the meshing gears 18 and 19. One such method will now be described with reference to FIGS. 5 to 7. Referring to FIGS. 5 to 7, the pressure plate 12 is firstly machined to provide an aperture 17 as shown in FIG. 5, the transverse dimensions of the portion of the aperture 17 which is to house the meshing gears 18 and 19 being such as to provide an arcuate space 50 between the toothed periphery of the gears 18 and 19 and the plate 12. The plate 12 is then mounted on one of the intermediate members 14 and as shown in FIG. 6 moulded inserts 51, of a material which is softer than that of the metal gears 18 and 19, are adhesively secured or bonded to the arcuate edges of the aperture 17 which are to bound the toothed periphery of the gears 18 and 19. The moulded inserts may be of filled carbon, for example, copper-filled carbon, alzen, plastics or cast iron. The thickness of the moulded inserts 51 is greater than the width of the space 50. The inserts 51 may extend over the whole length of the arcuate edges of the aperture 17 which are to bound the toothed periphery of the gears 18 and 19 but in practice I have found that it is sufficient for the inserts 51 to extend over only, for example, a ninety degree segment of those arcuate edges at the end thereof adjacent to the outlet region 21. The excess portions of the moulded inserts 51, that is, the portions of the inserts 51 which overlap the intended positions of the gears 18 and 19, are then removed by machining using the teeth of the gears 18 and 19 (FIG. 7). To this end, one of the gears is mounted on a spindle 26, and one end of the spindle 26 is inserted in a drill chuck while the other end of the spindle 26 is located in the appropriate hole 33. The gear is then rotated at a speed of approximately 400 to 500 RPM and gradually urged into the aperture 17 to remove the excess portion of one of the moulded inserts. This machining operation is then repeated for the other moulded insert using the other one of the gears. The gear pump is then assembled. During this assembly a force is applied to the plate 12 in the direction of the arrow 52 of FIG. 5 to ensure that the teeth of the gears 18 and 19 lightly abut the moulded inserts prior to the plate 12, the end pieces 10 and 11 and the intermediate members 13 and 14 being clamped together by the nuts and bolts 15 and 16.

The said lining may be constituted by a coating rather than a moulded insert. In this case, the pressure plate is firstly provided with the aperture 17 shown in FIG. 5 and the plate is then mounted on the intermediate member 14 with the aperture 17 aligned with the holes in the member 14. The surfaces of the plate 12 and the member 14 which do not require to be coated, that is the surfaces of the plate 12 bounding the inlet and outlet regions 20 and 21, and the surface of the intermediate member 14 bounding the aperture 17, are coated with a release agent. Moulded inserts 53 and 54 (FIG. 8) are then disposed within the aperture 17 to fill those portions of the aperture 17 which are not to be filled with a coating. More particularly, the insert 54 is arranged to fill completely the inlet and outlet regions 20 and 21 of the aperture 17 and the space intermediate these regions 20 and 21, and the moulded inserts 53 are shaped to provide a constant width space between the moulded inserts 53 and the arcuate surfaces of the plate 12 which are to bound the toothed peripheries of the gears 18 and 19, the space being greater than the space 50 (FIG. 5) so that part of the coating to be formed will overlap the intended position of the gears 18 and 19 within the plate 12. Conveniently the moulded inserts 53 have projection pins (not shown) which extend into, and are a tight fit in, the respective holes 33 in the member 14. A suitable coating material is then injected into the space between the moulded inserts 53 and the plate 12 to provide coatings 32. The coating material is an araldite based thixotropic paint mixed with a suitable hardener and may be that sold by Robnor Paints Limited under the catalogue number 4/PX232D/70/Green/71/34. The paint is then cured at a temperature of 120°C for a period of approximately 1 hour, after which the inserts 53 and 54 are removed (FIG. 9). The excess coating is then removed by machining using the gears 18 and 19 one at a time as described previously and as shown in FIG. 10.

The coating may be of a material other than araldite based thixotropic paints. For example, the coating may be of solder or white metal.

Although in the methods described with reference to FIGS. 5 to 7, and FIGS. 8 to 10, the machining is effected by using the gears 18 and 19 one at a time, it is visualized that the machining may be effected in a single operation by using the gears 18 and 19 simultaneously.

It has been found that by bounding the gears 18 and 19 with a material which is softer than the metal gears 18 and 19, virtually no running-in of the gear pump is necessary.

Furthermore, it is visualized that the use of a lining which is substantially softer than the plate 12 will permit the gears 18 and 19 to be of a metal which is considerably softer than the metal used previously thereby substantially reducing the cost of manufacturing the gears 18 and 19. For example, in these circumstances the gears 18 and 19 may be of mild steel or sintered metal instead of the hardened steel used previously.

The surfaces of the plate 12 or the linings which have been machined by the gears 18 and 19 may not be perfectly smooth. In such cases these surfaces may be coated with a very thin layer of Engineer's Marking Blue or a similar resin-based material before the gear pump is finally assembled. Also, the gears 18 and 19 may themselves be coated with a very thin layer of the resin-based material.

Although in the methods described the machining is effected by the gears which are to be used in the gear pump, it is visualized that other gears may be used to effect the machining provided that they are of similar or identical form to the gears which are to be used in the gear pump.

I claim:

1. A method of manufacturing a gear pump of the kind comprising a housing including a body having surfaces defining a recess, a pair of metal gears disposed in the recess in meshing engagement, each gear having a multiplicity of teeth spaced apart around its periphery, individual shafts for the gears, means mounting the gears on respective ones of the shafts for rotation therewith, and bearing apertures in which the shafts are rotatably mounted, said recess including an inlet region centrally and to one side of an imaginary line joining the rotational axes of the gears and an outlet region centrally and to the opposite side of the imaginary line whereby hydraulic fluid is impelled by the gears from the inlet region to the outlet region; said method comprising the steps of partially forming the said recess in which the meshing gears are to be disposed, mounting a said gear on a said shaft for rotation therewith, rotatably mounting the said shaft in one of said bearing apertures with said gear being positioned outside of said recess in overlapping relation to a portion of said body which bounds said recess, rotatably driving the said gear and the said shaft about their rotational axis, and effecting relative movement between the gear and the said body by moving said shaft longitudinally within its bearing aperture to draw said gear toward and into said recess while the gear is being rotatably driven thereby to cause the gear teeth to cut into said body portion to increase the transverse dimensions of the said recess.

2. A method according to claim 1, wherein the body is of a metal which is softer than that of the said gears, and wherein the transverse dimensions of the recess are increased by directly machining the metal body with at least one said gear.

3. A method according to claim 1 including the steps of forming within the body an aperture in which the meshing gears are to be disposed, the transverse dimensions of the aperture being adapted to provide a continuous space between the edge of the aperture and the toothed periphery of the meshing gears, lining at least part of the said edge of the aperture with a material which is substantially softer than the material of the meshing gears, and machining away a part of the lining material with a said gear to increase the transverse dimensions of the lined aperture thereby to provide said recess.

4. A method according to claim 1 including the steps of forming within a face of the body an aperture in which the meshing gears are to be disposed, the transverse dimensions of the aperture being adapted to provide a continuous space between the edge of the aperture and the toothed periphery of the meshing gears, lining at least part of the edge of the aperture which is to bound the toothed periphery of each gear with a material which is substantially softer than the material of the meshing gears, disposing a said gear parallel to the said face with the said gear aligned with the said body, the thickness of the lining material being greater than the width of the said space so that the teeth of the said gear overlap a portion of the lining material, and driving the said gear into the body along a path parallel to the rotational axis of the said gear while the gear is being rotatably driven about its rotational axis to cause the teeth of the said gear to machine away the said overlapping portion of the lining material.

5. A method according to claim 3, wherein the lining material is in the form of a coating.

6. A method according to claim 3, wherein the lining material comprises a moulded insert.

7. A method of manufacturing a gear pump of the kind comprising a housing having a shaped recess, a pair of metal gears disposed in the recess in meshing engagement, each gear having a multiplicity of teeth spaced apart around its periphery, individual shafts for the gears, means mounting the gears on respective ones of the shafts for rotation therewith, and bearing means in which the shafts are rotatably mounted, said recess including an inlet region centrally and to one side of an imaginary line joining the rotational axes of the gears and an outlet region centrally and to the opposite side of the imaginary line whereby hydraulic fluid is impelled by the gears from the inlet region to the outleg region; the method comprising a first step of at least partially forming the recess, a second step of rotatably mounting one of said shafts and its gears in a respective said bearing means, a third step of rotatably driving said one shaft, a fourth step of machining with the the gear carried by said one shaft a surface of the housing which is to bound the toothed periphery of that gear to increase the transverse dimensions of the recess, said fourth step comprising effecting relative movement between that gear and the housing by moving said one shaft longitudinally in its respective bearing means while rotating said one shaft, a fifth step of rotatably mounting the other of said shafts and its gear in a respective said bearing means, a sixth step of rotatably driving said other shaft, and a seventh step of machining with the gear carried by said other shaft a surface of the housing which is to bound the toothed periphery of that gear further to increase the transverse dimensions of the recess, said seventh step comprising effecting relative movement between that gear and the housing by moving said other shaft longitudinally in its respective bearing means while rotating said other shaft.

8. A method of manufacturing a gear pump of the kind comprising a housing having a shaped recess, a pair of metal gears disposed in the recess with their teeth in meshing engagement, individual shafts for the gears, means mounting the gears on respective ones of the said shafts for rotation therewith, and bearing means in which the shafts are rotatably mounted, said recess including an inlet region centrally and to one side of an imaginary line joining the rotational axes of the gears and an outlet region centrally and to the opposite side of the imaginary line whereby hydraulic fluid is impelled by the gears from the inlet region to the outlet region, the method comprising a first step of partially forming the said recess, a second step of mounting a said gear on a said shaft for rotation therewith about the longitudinal axis of that shaft, a third step of rotatable mounting the said shaft in a said bearing means, a fourth step of effecting relative angular displacement between the housing and the said gear about the longitudinal axis of the said shaft, and a fifth step of effecting relative linear displacement between the housing and the said gear during said relative angular displacement to cause the gear teeth to cut into the housing to increase the transverse dimensions of the said recess.

9. A method of manufacturing a gear pump of the kind comprising a housing having a shaped recess, a pair of metal gears mounted in the recess with their teeth in meshing engagement, individual shafts for the gears, means mounting the gears on respective ones of the shafts for rotation therewith, and bearing means in which the shafts are rotatably mounted, said recess including an inlet region centrally and to one side of an imaginary line joining the rotational axes of the gears and an outlet region centrally and to the opposite side of the imaginary line whereby hydraulic fluid is impelled by the gears from the inlet region to the outlet region; said method including the steps of partially forming the said recess, mounting a first said gear on a first said shaft for rotation therewith about the longitudinal axis of that shaft, mounting a second said gear on a second said shaft for rotation therewith about the longitudinal axis of the second shaft, rotatably mounting the said first and second shafts in respective said bearing means, and rotating the said gears together about their respective rotational axes while simultaneously effecting relative linear displacement between the housing and the said gears to cause the gear teeth to cut into the housing thereby to increase the transverse dimensions of the said recess.

* * * * *